(12) United States Patent
Yano et al.

(10) Patent No.: US 7,586,569 B2
(45) Date of Patent: Sep. 8, 2009

(54) IPS MODE LIQUID CRYSTAL DISPLAY

(75) Inventors: Shuuji Yano, Ibaraki (JP); Masayuki Kawai, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 536 days.

(21) Appl. No.: 11/084,027

(22) Filed: Mar. 21, 2005

(65) Prior Publication Data

US 2005/0213012 A1 Sep. 29, 2005

(30) Foreign Application Priority Data

Mar. 26, 2004 (JP) .............................. 2004-090874

(51) Int. Cl.
*G02F 1/1335* (2006.01)

(52) U.S. Cl. ..................... 349/117; 349/102; 349/141

(58) Field of Classification Search ........................ None
See application file for complete search history.

(56) References Cited

U.S. PATENT DOCUMENTS

| | | | |
|---|---|---|---|
| 4,852,976 A * | 8/1989 | Suzuki ........................ 349/119 |
| 2001/0043302 A1 * | 11/2001 | Inoue et al. ................. 349/137 |
| 2002/0033923 A1 | 3/2002 | Shimoshikiryou et al. |
| 2002/0145691 A1 | 10/2002 | Ito |
| 2003/0210370 A1 | 11/2003 | Yano et al. |
| 2004/0032547 A1 | 2/2004 | Yano et al. |
| 2005/0179842 A1 | 8/2005 | Ichihashi |

(Continued)

FOREIGN PATENT DOCUMENTS

CN 1448734 A 10/2003

(Continued)

OTHER PUBLICATIONS

Office Action of Corresponding Chinese Patent Application No. 200510055976.X issued Mar. 30, 2007.

(Continued)

*Primary Examiner*—David Nelms
*Assistant Examiner*—Lucy P Chien
(74) *Attorney, Agent, or Firm*—Westerman, Hattori, Daniels & Adrian, LLP.

(57) ABSTRACT

An IPS mode liquid crystal display comprising a liquid crystal cell, an optical film (F1) provided on a cell substrate on one side of the liquid crystal cell and comprises a polarizing plate comprising a transparent protective film having an in-plane retardation Re 10 nm or less and a thickness direction retardation Rth in the range of from 30 to 100 nm, a retardation film having an Nz value in the range of from 0.3 to 0.7 and an in-plane retardation $Re_1$ in the range of from 200 to 300 nm, and an optical film (F2) provided on a cell substrate on the other side of the liquid crystal cell and comprises the polarizing plate and a retardation film having an Nz value in the range of from 0.9 to 1.2 and an in-plane retardation $Re_2$ in the range of from 150 to 280 nm, and the absorption axes of the polarizing plates of the optical film (F1) and the optical film (F2) are perpendicular to each other, and both films are disposed so that the retardation film sides face the liquid crystal cell. The IPS mode liquid crystal display has a high contrast ratio across a wide range, and capable of realizing a better view.

3 Claims, 3 Drawing Sheets

U.S. PATENT DOCUMENTS

2006/0159866 A1 7/2006 Ito

FOREIGN PATENT DOCUMENTS

| EP | 1 553 432 A1 | | 7/2005 |
|---|---|---|---|
| JP | 4-305602 | | 10/1992 |
| JP | 04305602 A | * | 10/1992 |
| JP | 4-371903 | | 12/1992 |
| JP | 2000-284118 A | | 10/2000 |
| JP | 2002-055341 A | | 2/2002 |
| JP | 2002-090764 A | | 3/2002 |
| JP | 2002-296423 A | | 10/2002 |
| JP | 2004-004641 A | | 1/2004 |
| JP | 2004-004642 A | | 1/2004 |
| JP | 2004-157523 A | | 6/2004 |
| JP | 2005-309379 A | | 11/2005 |

OTHER PUBLICATIONS

Office Action of Corresponding Japanese Patent Application No. 2005-048345.

* cited by examiner

IPS MODE LIQUID CRYSTAL DISPLAY

BACKGROUND OF THE INVENTION

1. Field of the Invention

This invention relates to an IPS mode liquid crystal display using an optical film obtained by laminating a polarizing plate with retardation film, and operating in an IPS mode.

2. Description of the Background Art

Conventionally, as a liquid crystal display, there has been used a liquid crystal display in TN mode in which a liquid crystal having a positive dielectric anisotropy is twisted aligned between substrates mutually facing to each other. However, in TN mode, even when black view is displayed, optical leakage resulting from birefringence caused by liquid crystal molecule near a substrate made it difficult to obtain perfect display of black color owing to driving characteristics thereof. On the other hand, in a liquid crystal display in IPS mode, since liquid crystal molecule has almost parallel and homogeneous alignment to a substrate surface in non-driven state, light passes through the liquid crystal layer, without giving almost any change to a polarization plane, and as a result, arrangement of polarizing plates on upper and lower sides of the substrate enables almost perfect black view in non-driven state.

However, although almost perfect black view may be realized in normal direction to a panel in IPS mode, when a panel is observed in oblique direction, inevitable optical leakage occurs caused by characteristics of a polarizing plate in a direction shifted from an optical axis of the polarizing plates placed on upper and lower sides of the liquid crystal cell, as a result, leading to a problem of narrowing of a viewing angle. That is, a polarizing plate using a triacetyl cellulose (TAC) film generally employed, as a protective film, has had a problem that a viewing angle is narrowed by birefringence that the TAC film has.

In order to solve this problem, a polarizing plate is used in which the shift of a geometric axis of a polarizing plate given when observed from oblique direction is compensated by a retardation film. These polarizing plates are disclosed in JP-A No. 4-305602, and JP-A. 4-371903. In the polarizing plates described in the above-mentioned documents, a retardation film is used as a protective film for a polarizer. With retardation films described in the above-mentioned documents, however, it is difficult to realize a sufficiently wide viewing angle of an IPS mode liquid crystal display.

SUMMARY OF THE INVENTION

It is an object of the invention to provide an IPS mode liquid crystal display, using an optical film obtained by laminating a polarizing plate with a retardation film, having a high contrast ratio across a wide range, and capable of realizing a better view.

The inventors have conducted serious studies in order to solve the task to, as a result, find an IPS mode liquid crystal display shown below, which has led to completion of the invention.

That is, the present invention related to an IPS mode liquid crystal display (1) comprising a liquid crystal cell containing a pair of substrates between which a liquid crystal layer is sandwiched and driven in IPS mode and a backlight, comprising:

an optical film (F1) provided on a cell substrate on one side of the liquid crystal cell and comprises a polarizing plate and a retardation film together in such a way that an absorption axis of the polarizing plate and a slow axis of the retardation film are perpendicular or parallel to each other, wherein the polarizing plate comprises a transparent protective film on both surfaces of a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d (nm) by definition, an in-plane retardation $Re=(nx-ny) \times d$ is 10 nm or less and a thickness direction retardation $Rth=\{(nx+ny)/2-nz\} \times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_1$, $ny_1$ and $nz_1$, respectively; and a film thickness is $d_1$ (nm) by definition, an Nz value represented by $Nz=(nx_1-nz_1)/(nx_1-ny_1)$ is in the range of from 0.3 to 0.7 and an in-plane retardation $Re_1=(nx_1-ny_1) \times d_1$ is in the range of from 200 to 300 nm, and an optical film (F2) provided on a cell substrate on the other side of the liquid crystal cell and comprises a polarizing plate and a retardation film together in such a way that an absorption axis of the polarizing plate and a slow axis of the retardation film are parallel to each other, wherein the polarizing plate comprises a transparent protective films on both surfaces of a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d (nm) by definition, an in-plane retardation $Re=(nx-ny) \times d$ is 10 nm or less and a thickness direction retardation $Rth=\{(nx+ny)/2-nz\} \times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_2$, $ny_2$ and $nz_2$, respectively; and a film thickness is $d_2$ (nm) by definition, an Nz value represented by $Nz=(nx_2-nz_2)/(nx_2-ny_2)$ is in the range of from 0.9 to 1.2 and an in-plane retardation $Re_2=(nx_2-ny_2) \times d_2$ is in the range of from 150 to 280 nm, wherein the absorption axes of the polarizing plates of the optical film (F1) and the optical film (F2) are perpendicular to each other, and both films are disposed so that the retardation film sides face the liquid crystal cell.

The optical film (F1) and the optical film (F2), in a case where the polarizing plates having protective films with the predetermined retardation values are disposed in a cross-Nichols state, can cancel light leakage in a direction deviated from the optical axis with the specific retardation films and therefore, are suitably used in an IPS mode liquid crystal display. Especially, the optical films (F1 and F2), in the case, have a function compensating reduction in contrast in an oblique direction of the liquid crystal layer. The optical film (F1) is obtained as a laminate so that the absorption axis of the polarizing plate and the slow axis of the retardation film are perpendicular or parallel to each other. On the other hand, the optical film (F2) is obtained as a laminate so that the absorption axis of the polarizing plate and the slow axis of the retardation film are parallel to each other.

In the IPS mode liquid crystal display (1) of the invention, the optical film (F1) is disposed on one side of a liquid crystal cell and the optical film (F2) is disposed on the other side of the liquid crystal cell to thereby enable light leakage in a black view state to reduced, which has conventionally occurred in an IPS mode liquid crystal display. Such an IPS mode liquid crystal display has a high contrast ratio at every azimuth angle, which enables a better view with a wide viewing angle to be realized.

The transparent protective films on the polarizing plates used in the optical film (F1) and the optical film (F2) have an in-plane retardation Re of preferably 10 nm or less and more preferably 6 nm or less and a thickness direction retardation Rth preferably in the range of from 30 to 100 nm and more preferably in the range of from 30 to 60 nm. The optical film (F1) and the optical film (F2) perform a high compensating effect with the retardation films to a transparent protective film of a polarizer each having such retardation. No specific limitation is imposed on a thickness (d) of a transparent protection film; the thickness d is generally 500 μm or less, preferably in the range of from 1 to 300 μm and especially preferably in the range of from 5 to 200 μm.

The retardation film used in the optical film (F1) has the above-mentioned Nz value in the range of from 0.3 to 0.7 and the in-plane retardation $Re_1$ in the range of from 200 to 300 nm. The Nz value is preferably 0.4 or more, and more preferably 0.45 or more from the viewpoint of increase in compensating function. On the other hand, the Nz value is preferably 0.6 or less and more preferably 0.55 or less. The in-plane retardation $Re_1$ is preferably 240 nm or more and more preferably 270 nm or less from the viewpoint of increase in compensating function.

The retardation film used in the optical film (F2) has the above-mentioned Nz value in the range of from 0.9 to 1.2 and the in-plane retardation $Re_2$ in the range of from 150 to 280 nm. The Nz value is preferably 0.95 or more, and more preferably 0.98 or more from the viewpoint of increase in compensating function. On the other hand, the Nz value is preferably 1.1 or less and more preferably 1.05 or less. The in-plane retardation $Re_2$ is preferably 160 nm or more and more preferably 180 nm or more and preferably 250 nm or less from the viewpoint of increase in compensating function.

In the IPS mode liquid crystal display (1), the liquid crystal cell driven in IPS mode is preferably a liquid crystal cell in IPS mode having a retardation value in the range of from 230 to 400 nm for wavelength of 550 nm when no voltage is applied.

No specific limitation is placed on a material of which the liquid cell in the IPS mode is made and materials ordinarily used in a liquid cell can be properly used, while it is preferable to use a material having a retardation value in the range of from 230 to 400 nm in a liquid cell for wavelength of 550 nm when no voltage is applied from the viewpoint of suitable impartation of a compensating function of the retardation film. The retardation value of the liquid crystal cell for wavelength of 550 nm is preferably in the range of from 230 to 360 nm, more preferably in the range of from 270 to 360 nm and more preferably in the range of from 270 to 310 when no voltage is applied. Note, the sum of the retardation value in a liquid cell and the retardation value of the retardation film used in the optical film (F2) is preferably close to the wavelength (550 nm), which is used for retardation measurement and is similar to around center wavelength of visible light, or 0 nm from the viewpoint of compensate reduction in contrast in an oblique direction of the liquid crystal layer.

In the IPS mode liquid crystal display (1), preferably, the optical film (F1) is disposed on the cell substrate on the viewing side and the optical film (F2) is disposed on the cell substrate on the side of incidence of light from the backlight, and an extraordinary refractive index direction of a liquid crystal material in the liquid crystal cell when no voltage is applied and the absorption axis of the polarizing plate in the optical film (F2) on the light incidence side are parallel to each other. In the above disposition, as the extraordinary refractive index direction of the liquid crystal material in the liquid crystal cell and the slow axis of the retardation film used in the optical film (F2) are parallel to each other, the sum of the retardation value in a liquid cell and the retardation value of the retardation film used in the optical film (F2) is expressed as an addition value of the each retardation values. The addition value of the each retardation values is preferably close to 550 nm from the viewpoint of compensate reduction in contrast in an oblique direction of the liquid crystal layer. The addition value of the each retardation values is preferably 550 nm±40 nm, more preferably 550 nm±30 nm, more preferably 550 nm±20 nm.

In the IPS mode liquid crystal display (1), preferably, the optical film (F2) is disposed on the cell substrate on the viewing side and the optical film (F1) is disposed on the cell substrate on the side of incidence of light from the backlight, and an extraordinary refractive index direction of a liquid crystal material in the liquid crystal cell when no voltage is applied and the absorption axis of the polarizing plate in the optical film (F1) on the light incidence side are perpendicular to each other. In the above disposition, as the extraordinary refractive index direction of the liquid crystal material in the liquid crystal cell and the slow axis of the retardation film used in the optical film (F2) are parallel to each other, the sum of the retardation value in a liquid cell and the retardation value of the retardation film used in the optical film (F2) is expressed as an addition value of the each retardation values. The addition value of the each retardation values is preferably close to 550 nm from the viewpoint of compensate reduction in contrast in an oblique direction of the liquid crystal layer. The addition value of the each retardation values is preferably 550 nm±40 nm, more preferably 550 nm±30 nm, more preferably 550 nm±20 nm.

Also, the present invention related to an IPS mode liquid crystal display (2) comprising a liquid crystal cell containing a pair of substrates between which a liquid crystal layer is sandwiched and driven in IPS mode and a backlight, comprising:

an optical film (F1) provided on a cell substrate on one side of the liquid crystal cell and comprises a polarizing plate and a retardation film together in such a way that an absorption axis of the polarizing plate and a slow axis of the retardation film are perpendicular or parallel to each other, wherein the polarizing plate comprises a transparent protective film on both surfaces of a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d (nm) by definition, an in-plane retardation $Re=(nx-ny)\times d$ is 10 nm or less and a thickness direction retardation $Rth=\{(nx+ny)/2-nz\}\times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_1$, $ny_1$ and $nz_1$, respectively; and a film thickness is $d_1$ (nm) by definition, an Nz value represented by $Nz=(nx_1-nz_1)/(nx_1-ny_1)$ is in the range of from 0.3 to 0.7 and an in-plane retardation $Re_1=(nx_1-ny_1)\times d_1$ is in the range of from 200 to 300 nm, and an optical film (F3) provided on a cell substrate on the other side of the liquid crystal cell and comprises a polarizing plate and a retardation film together in such a way that an absorption axis of the polarizing plate and a slow axis of the retardation film are perpendicular to each other, wherein the polarizing plate comprises a transparent protective films on both surfaces a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d (nm) by definition, an in-plane retardation $Re=(nx-ny)\times d$ is 10 nm or less and a thickness direction retardation $Rth=\{(nx+ny)/2-nz\}\times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_3$, $ny_3$ and $nz_3$, respectively; and a film thickness is $d_3$ (nm) by definition, an Nz value represented by $Nz=(nx_3-nz_3)/(nx_3-ny_3)$ is in the range of from −0.15 to 0.15 and an in-plane retardation $Re_3=(nx_3-ny_3)\times d_3$ is in the range of from 230 to 400 nm, wherein the absorption axes of the polarizing plates of the optical film (F1) and the optical film (F3) are perpendicular to each other, and both films are disposed so that the retardation film sides face the liquid crystal cell.

The optical film (F1) and the optical film (F3), in a case where the polarizing plates having protective films having the predetermined retardation values are disposed in a cross-Nichols state, can cancel light leakage in a direction deviated from the optical axis with the specific retardation films and therefore, are suitably used in an IPS mode liquid crystal display. Especially, the optical films (F1 and F3), in the case, have a function compensating reduction in contrast in an oblique direction of the liquid crystal layer. The optical film (F1) is obtained as a laminate so that the absorption axis of the polarizing plate and the slow axis of the retardation film are perpendicular or parallel to each other. On the other hand, the optical film (F3) is obtained as a laminate so that the absorption axis of the polarizing plate and the slow axis of the retardation film are perpendicular to each other.

In the IPS mode liquid crystal display (2) of the invention, the optical film (F1) is disposed on one side of a liquid crystal cell and the optical film (F3) is disposed on the other side of the liquid crystal cell to thereby enable light leakage in a black view state to be reduced, which has conventionally occurred in an IPS mode liquid crystal display. Such an IPS mode liquid crystal display has a high contrast ratio at every azimuth angle, which enables a better view with a wide viewing angle to be realized.

The transparent protective films of the polarizing plates used in the optical film (F1) and the optical film (F3) preferably can have a retardation value and a thickness similar to those of the optical films used in the IPS mode liquid crystal display (1). A retardation film used in the optical film (F1) can have an Nz value and a retardation value similar to those used in the IPS mode liquid display (1).

A retardation film used in the optical film (F3) has the above-mentioned Nz value in the range of from −0.15 to 0.15 and the in-plane retardation $Re_3$ in the range of from 230 to 400 nm. The Nz value is preferably −0.1 or more, and more preferably −0.05 or more from the viewpoint of increase in compensating function. On the other hand, the Nz value is preferably 0.1 or less and more preferably 0.05 or less. The in-plane retardation $Re_3$ is preferably 270 nm or more and preferably 360 nm or less and more preferably 320 nm or less from the viewpoint of increase in compensating function.

The IPS mode liquid crystal display (2) is preferably applied with a liquid crystal cell in IPS mode, as a liquid crystal cell driven in IPS mode, that has a retardation in the range of from 230 to 400 nm when no voltage is applied for wavelength of 550 nm in a similar manner to that in the IPS mode liquid crystal display (1). The range of retardation values is also similar to that in the IPS mode liquid crystal display (1), the retardation value of the liquid crystal cell for wavelength of 550 nm is preferably in the range of from 230 to 360 nm, more preferably in the range of from 270 to 360 nm and more preferably in the range of from 270 to 310 when no voltage is applied. Note, the sum of the retardation value in a liquid cell and the retardation value of the retardation film used in the optical film (F3) is preferably close to the wavelength (550 nm), which is used for retardation measurement and is similar to around center wavelength of visible light, or 0 nm from the viewpoint of compensate reduction in contrast in an oblique direction of the liquid crystal layer.

In the IPS mode liquid crystal display (2), preferably, a retardation value of the liquid crystal cell driven in IPS mode for wavelength of 550 nm when no voltage is applied and a retardation value of the retardation film used in the optical film (F3) for wavelength of 550 nm is almost equal to each other. The retardation values of both are almost equal to each other, thereby enabling a contrast ratio to be improved. Note that that the retardation values are almost equal to each other means that a difference between retardations is preferably on the order of 20 nm or less and more preferably 10 nm or less.

In the IPS mode liquid crystal display (2), preferably, the optical film (F1) is disposed on the cell substrate on the viewing side and the optical film (F3) is disposed on the cell substrate on the side of incidence of light from the backlight, and an extraordinary refractive index direction of a liquid crystal material in the liquid crystal cell when no voltage is applied and the absorption axis of the polarizing plate in the optical film (F3) on the light incidence side are parallel to each other. In the above disposition, as the extraordinary refractive index direction of the liquid crystal material in the liquid crystal cell and the slow axis of the retardation film used in the optical film (F3) are perpendicular to each other, the sum of the retardation value in a liquid cell and the retardation value of the retardation film used in the optical film (F3) is expressed as a subtraction value of the each retardation values. The subtraction value of the each retardation values is preferably close to 0 nm from the viewpoint of compensate reduction in contrast in an oblique direction of the liquid crystal layer. The absolute value of the subtraction value of the each retardation values is preferably 0 nm±40 nm, more preferably 0 nm±30 nm, more preferably 0 nm±20 nm, more preferably 0 nm±10 nm.

In the IPS mode liquid crystal display (2), preferably, the optical film (F3) is disposed on the cell substrate on the viewing side and the optical film (F1) is disposed on the cell substrate on the side of incidence of light from the backlight, and an extraordinary refractive index direction of a liquid crystal material in the liquid crystal cell when no voltage is applied and the absorption axis of the polarizing plate in the optical film (F1) on the light incidence side are perpendicular to each other. In the above disposition, as the extraordinary refractive index direction of the liquid crystal material in the liquid crystal cell and the slow axis of the retardation film used in the optical film (F3) are perpendicular to each other, the sum of the retardation value in a liquid cell and the retardation value of the retardation film used in the optical film (F3) is expressed as a subtraction value of the each retardation values. The subtraction value of the each retardation values is preferably close to 0 nm from the viewpoint of compensate reduction in contrast in an oblique direction of the liquid crystal layer. The absolute value of the subtraction value of the each retardation values is preferably 0 nm±40 nm, more preferably 0 nm±30 nm, more preferably 0 nm±20 nm, more preferably 0 nm±10 m.

DESCRIPTION OF THE PREFERRED EMBODIMENTS

Description will be given of an IPS mode liquid crystal display of the invention together with an optical film (F1), an optical film (F2) and an optical film (F3) below with reference to the accompanying drawing.

Figure 1:
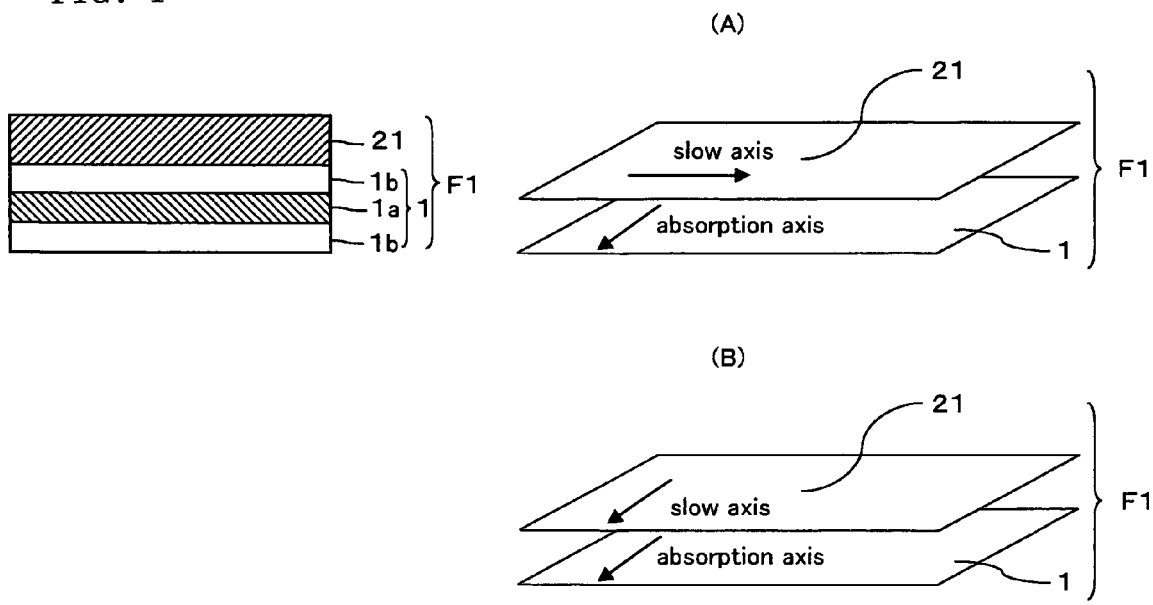
FIGS. 1(A) and 1(B) is a sectional view and conceptual diagrams of an optical film (F1) used in an IPS mode liquid crystal display of the invention.
Figure 2:
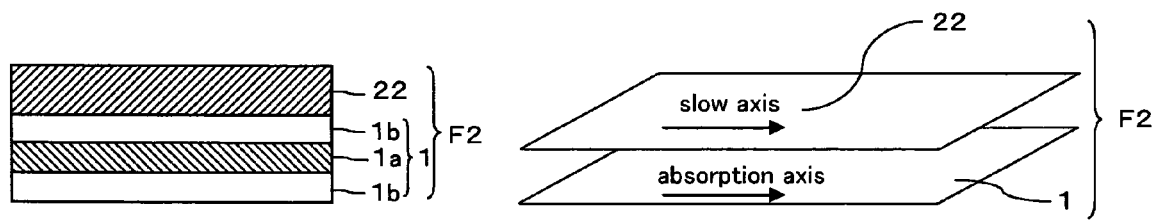
FIG. 2 is a sectional view and a conceptual diagram of an optical film (F2) used in an IPS mode liquid crystal display of the invention.
Figure 3:
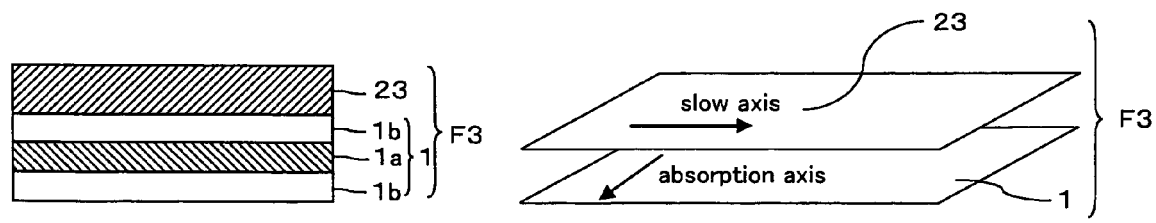
FIG. 3 is a sectional view and a conceptual diagram of an optical film (F3) used in an IPS mode liquid crystal display of the invention.

An optical film (F1), an optical film (F2) and an optical film (F3) of the invention are, as shown in FIGS. 1(A) and 1(B) to 3, of structures in which respective retardation films 21, 22 and 23 are laminated with polarizing plates 1. As the polarizing plate 1 used here is a polarizer 1a on both sides of which transparent protective films 1b are laminated. FIGS. 1 to 3 are examples that in each example, a retardation film 2 is laminated on one side of a polarizer 1. Retardation films 21, 22 and 23 each having the Nz value and the in-plane retardation is used in the optical film (F1), the optical film (F2) and the optical film (F3).

The optical film (F1) is, as shown in FIGS. 1(A) and 1(B), of a structure in which the polarizing plate 1 and the retardation film 21 are laminated together so that the absorption axis of the polarizer 1 and the slow axis of the retardation film 21 are perpendicular or parallel to each other. While the optical film (F1) shows a similar function in any of a case where the absorption axis of the polarizing plate 1 and the slow axis of the retardation film 21 are perpendicular to each other and a case where the absorption axis of the polarizing plate 1 and the slow axis of the retardation film 21 are parallel to each other, a retardation film in a roll after stretching and the polarizing plate 1 in a roll can be continuously adhered to each other if the both axes are parallel to each other, thereby enabling a fabrication process to be simplified. FIG. 1(A) is a case where the absorption axis of the polarizing plate 1 and the slow axis of the retardation film 21 are perpendicular to each other as a laminate, while FIG. 1(B) is a case where the absorption axis of the polarizing plate 1 and the slow axis of the retardation film 21 are parallel to each other as a laminate. The optical film (F2) is, as shown in FIG. 2, of a structure in which the polarizing plate 1 and the retardation film 21 are laminated together so that the absorption axis of the polarizer 1 and the slow axis of the retardation film 21 are parallel to each other. The optical film (F3) is, as shown in FIG. 3, of a structure in which the polarizing plate 1 and the retardation film 21 are laminated so that the absorption axis of the polarizer 1 and the slow axis of the retardation film 21 are perpendicular to each other.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a transparent protective film provided on a polarizer, any of transparent films can be used without placing a limitation thereon as far as the in-plane retardation Re is 10 nm or less and the thickness direction retardation Rth is in the range of 30 to 100 nm. As a material forming the protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylnitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyetherether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned. As a material of the transparent protective film, suitable is triacetyl cellulose generally used as the transparent protective film of the polarizer. Any of the transparent protective films can be properly stretched as far as the in-plane retardation Re is in the range and the thickness direction retardation Rth is in the range.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

The retardation films having the Nz values in the range and the in-plane retardations in the range are used in an optical film (F1), and an optical film (F2) and an optical film (F3), respectively. The retardation film having the Nz value in the range of 0.3 to 0.7 and the in-plane retardation $Re_1$ in the range of 200 to 300 nm is used in the optical film (F1). The retardation film having the Nz value in the range of 0.9 to 1.2 and the in-plane retardation $Re_2$ in the range of 150 to 280 nm is used in the optical film (F2). The retardation film preferably satisfies a relation of $\{\Delta nd(450\ nm)/\Delta nd(550\ nm)\}<1$ in wavelength dependency of retardation, that is shows an anomalous dispersion from the viewpoint of contrast. The $\Delta nd(450\ nm)$ and the $\Delta nd(550\ nm)$ are in-plane retardations in respective wavelengths. Examples of retardation films include a birefringent film, which is a polymer film, and an aligned film of a liquid crystal polymer. A retardation film having the Nz value in the range of −0.15 to 0.15 and the in-plane retardation $Re_3$ in the range of 230 to 400 nm is used in the optical film (F3). The retardation film used in the optical film (F3) is preferably of normal dispersion (the same as the dispersion of a liquid crystal).

Among polymers are, for example: polystyrens; polycarbonates; polyolefins, such as and polypropylene; polyesters, such as polyethylene terephthalate and polyethylenenaphthalate; cycloaliphatic polyolefins, such as poly norbornene etc.; polyvinyl alcohols; polyvinyl butyrals; polymethyl vinyl ethers; poly hydroxyethyl acrylates; hydroxyethyl celluloses; hydroxypropyl celluloses; methylcelluloses; polyallylates; polysulfones; polyether sulfones; polyphenylene sulfides; polyphenylene oxides; poly allyl sulfones; polyvinyl alcohols; polyamides; polyimides; polyvinyl chlorides; cellulose based polymers; or various kinds of binary copolymers; ternary copolymers; and graft copolymers of the above-mentioned polymers; or their blended materials. A retardation film may be obtained by adjusting a refractive index in a thickness direction using a method in which a polymer film is biaxially stretched in a planar direction, or a method in which a polymer film is uniaxially or biaxially stretched in a planar direction, and also stretched in a thickness direction etc. And a retardation film may be obtained using, for example, a method in which a heat shrinking film is adhered to a polymer film, and then the combined film is stretched and/or shrunken under a condition of being influenced by a shrinking force to obtain tilted orientation.

As liquid crystalline polymers, for example, various kinds of principal chain type or side chain type polymers may be mentioned in which conjugated linear atomic groups (mesogen) demonstrating liquid crystal alignment property are introduced into a principal chain and a side chain of the polymer. As illustrative examples of principal chain type liquid crystalline polymers, for example, nematic orientated polyester based liquid crystalline polymers having a structure where mesogenic group is bonded by a spacer section giving flexibility, discotic polymers, and cholesteric polymers, etc. may be mentioned. As illustrative examples of side chain type liquid crystalline polymers, there may be mentioned a polymer having polysiloxanes, polyacrylates, polymethacrylates, or poly malonates as a principal chain skeleton, and having a mesogen section including a para-substituted cyclic compound unit giving nematic orientation through a spacer section comprising conjugated atomic group as side chain. As preferable examples of oriented films obtained from these liquid crystalline polymers, there may be mentioned a film whose surface of a thin film made of polyimide or polyvinyl alcohol etc. formed on a glass plate is treated by rubbing, and a film obtained in a method that a solution of a liquid crystalline polymer is applied on an oriented surface of a film having silicon oxide layer vapor-deposited by an oblique vapor deposition method and subsequently the film is heat-treated to give orientation of the liquid crystal polymer, and among them, a film given tilted orientation is especially preferable.

A laminating method for the above-mentioned retardation films and polarizing plates is not especially limited, and lamination may be carried out using pressure sensitive adhesive layers etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition, in the present invention, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

The IPS mode liquid crystal displays (1) and (2) of the invention, as shown in FIGS. 4 to 7, include a liquid crystal cell 3 driven in IPS mode, and constructed with a pair of substrates between which a liquid crystal layer is sandwiched; and a backlight. The backlight is provided on the light incidence side, which are omitted in the figures. A liquid crystal cell is constructed with a pair of substrates between which a liquid crystal layer is sandwiched, a group of electrodes formed on one of the pair of substrates, a liquid crystal composition layer having a dielectric anisotropy sandwiched between the pair of substrates, alignment control layers formed so as to face the pair of substrates for orienting molecules of the liquid crystal composition in predetermined directions and a driving means for applying a driving voltage to the group of electrodes. The group of electrodes has an arrangement structure so as to apply an electric field to the liquid crystal layer mainly in parallel to the interface between an alignment control layer and the liquid crystal cell. The liquid crystal layer, as described above, preferably has retardation in the range of from 230 nm to 400 nm when no voltage is applied for light having a wavelength of 550 nm.

An IPS mode liquid crystal display (1) of the invention has an optical film (F1) provided on the substrate of one side of the liquid crystal cell and an optical film (F2) provided on the substrate of the other side of the liquid crystal cell.

Figure 4:
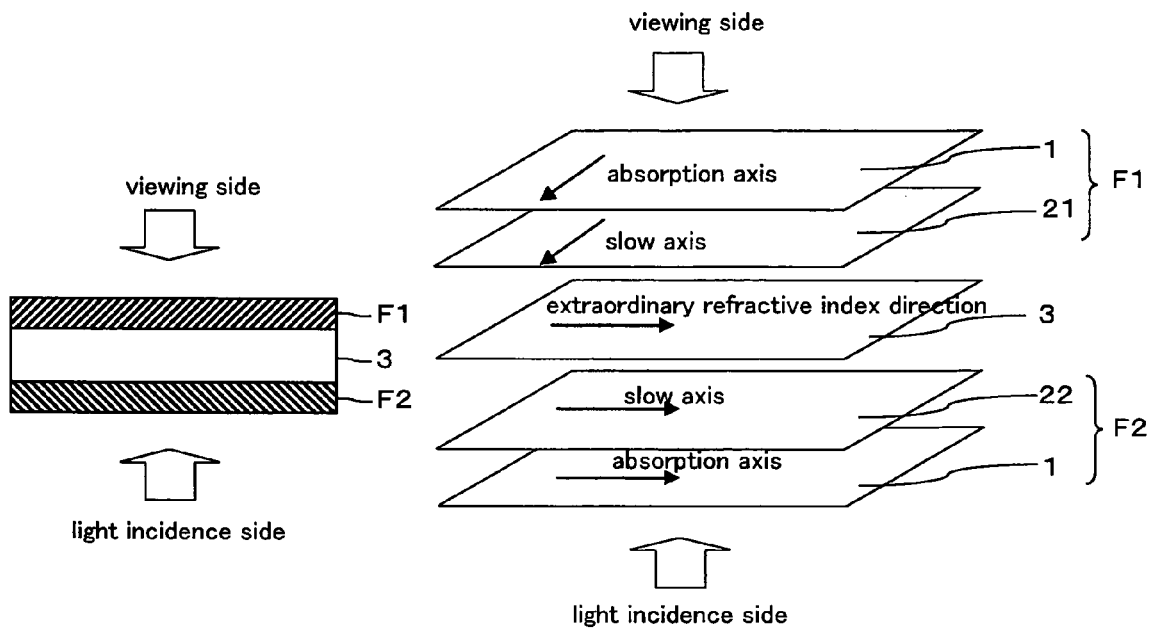
FIG. 4 is an example of conceptual diagram of an IPS mode liquid crystal display (1) of the invention.

FIG. 4 is a case where the optical film (F1) is disposed on the cell substrate on the viewing side and the optical film (F2) is disposed on the cell substrate on the light incidence side. In FIG. 4, there is shown the optical film (F1) constituted of a laminate of a polarizing plate 1 and a retardation film 21 in which the absorption axis of the polarizing plate 1 and the slow axis of the retardation 21 are parallel to each other. In such a way, as sown in FIG. 4, the optical film (F1) and the optical film (F2) are preferably arranged so that an extraordinary refractive index direction of a liquid crystal material in a liquid crystal cell 3 and the absorption axis of the polarizing plate 1 of the optical film (F2) on the light incidence side are parallel to each other.

Figure 5:
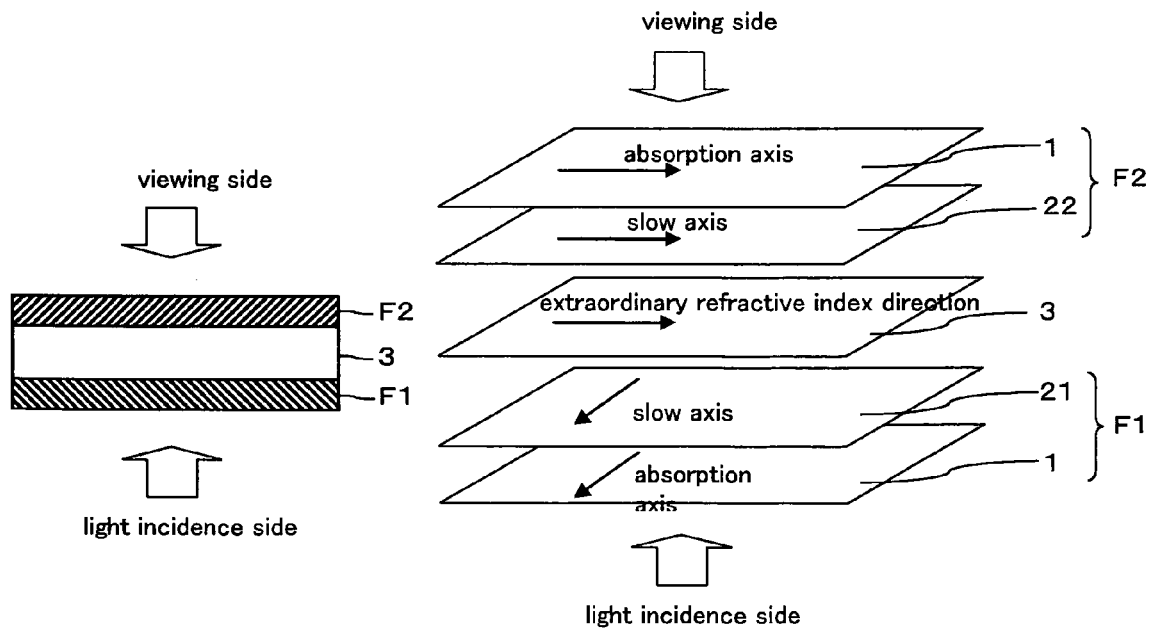
FIG. 5 is an example of conceptual diagram of the IPS mode liquid crystal display (1) of the invention.

FIG. 5 is a case where the optical film (F2) is disposed on the cell substrate on the viewing side and the optical film (F1) is disposed on the cell substrate on the light incidence side. In FIG. 5, there is shown the optical film (F1) constituted of a laminate of a polarizing plate 1 and a retardation film 21 in which the absorption axis of the polarizing plate 1 and the slow axis of the retardation film 21 are parallel to each other. In such a way, the optical film (F1) and the optical film (F2) are preferably arranged so that an extraordinary refractive index direction of the liquid crystal in the liquid crystal cell 3 and the absorption axis of the polarizing plate 1 of the optical film (F1) on the light incidence side are perpendicular to each other.

An IPS mode liquid crystal display (2) of the invention has an optical film (F1) provided on the substrate of one side of the liquid crystal cell and an optical film (F3) provided on the substrate of the other side of the liquid crystal cell.

Figure 6:
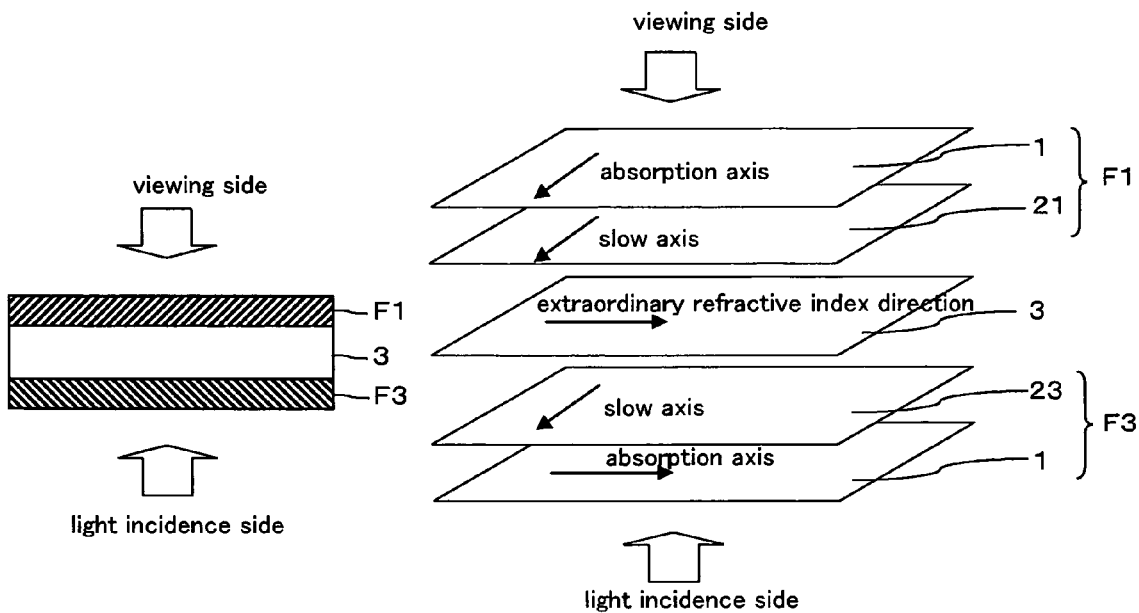
FIG. 6 is an example of conceptual diagram of an IPS mode liquid crystal display (2) of the invention.

FIG. 6 is a case where the optical film (F1) is disposed on the cell substrate on the viewing side and the optical film (F3) is disposed on the cell substrate on the light incidence side. In FIG. 6, there is shown the optical film (F1) constituted of a laminate of the polarizing plate 1 and the retardation film 21 in which the absorption axis of the polarizing plate 1 and the slow axis of the retardation 21 are parallel to each other. In such a way, as sown in FIG. 6, the optical film (F1) and the optical film (F3) are preferably arranged so that an extraordinary refractive index direction of the liquid crystal material in the liquid crystal cell 3 and the absorption axis of the polarizing plate 1 of the optical film (F3) on the light incidence side are parallel to each other.

Figure 7:
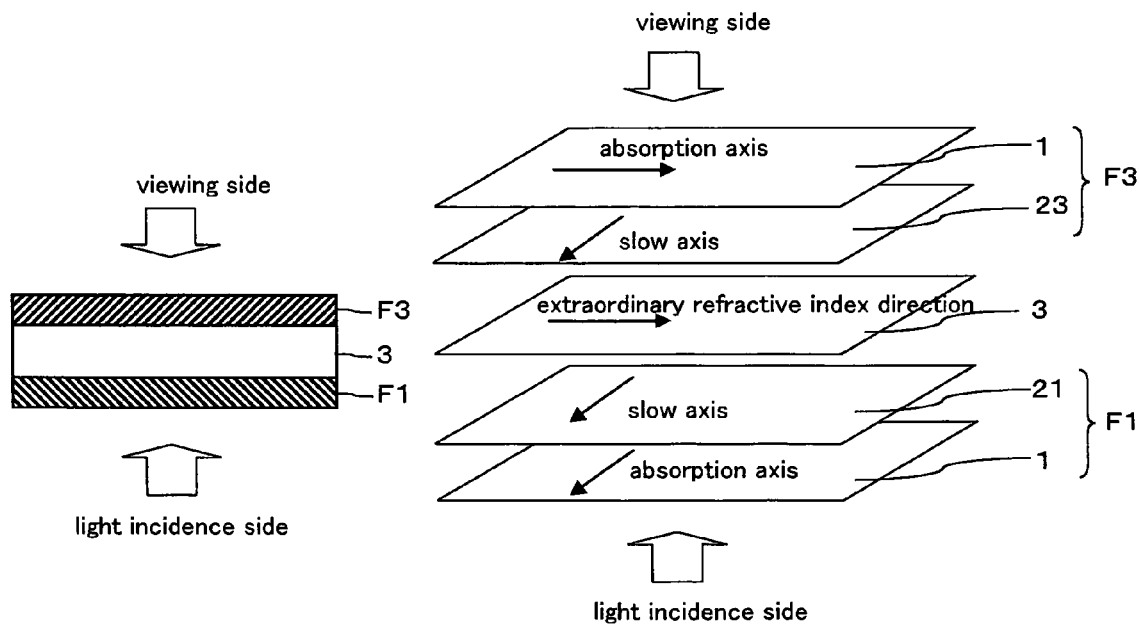
FIG. 7 is an example of conceptual diagram of an IPS mode liquid crystal display (2) of the invention.

FIG. 7 is a case where the optical film (F3) is disposed on the cell substrate on the viewing side and the optical film (F1) is disposed on the cell substrate on the light incidence side. In FIG. 7, as well, there is shown the optical film (F1) constituted of a laminate of the polarizing plate 1 and the retardation film 21 in which the absorption axis of the polarizing plate 1 and the slow axis of the retardation 21 are parallel to each other. In such a way, the optical film (F1) and the optical film (F3) are, as shown in FIG. 7, preferably arranged so that an extraordinary refractive index direction of the liquid crystal material in the liquid crystal cell 3 and the absorption axis of the polarizing plate 1 of the optical film (F1) on the light incidence side are perpendicular to each other when no voltage is applied.

In the IPS mode liquid crystal display (1) of the invention, as shown in FIGS. 4 and 5, the absorption axis of the polarizing plate 1 of the optical film (F1) and the absorption axis of the polarizing plate 1 of the optical film (F2) are perpendicular to each other and the optical film (F1) and the optical film (F2) are both disposed so that the sides of the retardation films 21 and 22 are on the liquid crystal 3 side.

In an IPS mode liquid crystal display (2) of the invention, as shown in FIGS. 6 and 7, the absorption axis of the polarizing plate 1 of the optical film (F1) and the absorption axis of the polarizing plate 1 of the optical film (F3) are perpendicular to each other and the optical film (F1) and the optical film (F3) are both disposed so that the sides of the retardation films 21 and 23 are on the liquid crystal 3 side.

The optical film (F1), the optical film (F2) and the optical film (F3) each can be laminated with an additional optical layer thereon in a practical use. No specific limitation is placed on an additional optical layer, and there can be used one optical layer, or two optical layers or more that is used in formation of a liquid crystal display or the like such as a retardation plate (including ½ or ¼ wavelength plate). Especially preferable is a polarizing plate obtained by further laminating a brightness enhancement film on a polarizing plate.

The polarizing plate on which the retardation plate is laminated may be used as elliptically polarizing plate or circularly polarizing plate. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transreflector type elliptically polarizing plate, etc. in which the above-mentioned reflection type polarizing plate or a transreflective type polarizing plate is combined with above described retardation plate respectively.

Although optical films and polarizing plates having the above-mentioned optical films laminated thereto may be formed using methods in which they are laminated sequentially and separately in a manufacturing process of liquid crystal displays, films that are beforehand laminated and constituted as an optical film are superior in stability of quality, assembly work, etc., thus leading to advantages of improved manufacturing processes for liquid crystal displays. Suitable adhering means, such as adhesive layer, may be used for lamination for layers. In adhesion of the above-mentioned polarizing plate and other optical films, the optical axes may be arranged so that they have proper arrangement angles based on desired retardation characteristics etc.

Formation of a liquid crystal display may be carried out according to conventional methods. A liquid crystal display is generally formed using methods in which component parts, such as lighting systems, are suitably assembled, and driving circuits are subsequently incorporated, if necessary, and the present invention is not especially limited except that the above-mentioned optical film is used, and any methods according to conventional methods may be adopted.

As liquid crystal displays, suitable liquid crystal displays, such as types using lighting systems or reflectors, may be formed.

Furthermore, on the occasion of formation of liquid crystal displays, one layer of two or more layers of suitable parts, such as diffusion plates, anti-glare layer coatings, protective plates, prism arrays, lens array sheets, optical diffusion plates, and backlights, may be arranged in suitable position.

EXAMPLE

Description will be described of the invention using examples in a concrete manner, but it should be understood that the invention is not limited to the examples.

An in-plane retardation Re, a thickness direction retardation Rth were calculated from refractive indexes nx, ny and nz of a transparent protective film for wavelength of 550 nm measured with an automatic birefringence measuring instrument (an automatic birefringence meter KOBRA21ADH, manufactured by Ohji Keisoku Kiki K.K.) and similar measurement was conducted on retardation films to calculate an Nz and an in-plane retardations Re ($Re_1$, $Re_2$ and $Re_3$). A retardation value when no voltage is applied of a liquid crystal cell for wavelength of 550 nm was measured with the Senarmont interference method.

Example 1

(Preparation of Polarizing Plate)

Triacetyl cellulose (TAC) films (transparent protective films each with a thickness of 80 μm) were laminated with an adhesive on both surfaces of a film (polarizer having a thickness of 20 μm) obtained by causing iodine to adsorb into a polyvinyl alcohol-based film and then stretching the film. The TAC film had an in-plane retardation Re of 4 nm and a thickness direction retardation Rth of 50 nm.

(Optical Film (F1))

A polycarbonate film was stretched to thereby obtain a retardation film having a thickness of 50 μm, an in-plane retardation $Re_1$ of 260 nm and an Nz of 0.5. The retardation film and the polarizing plate were laminated one the other with a pressure sensitive adhesive so that the slow axis of the retardation film and the absorption axis of the polarizing plate are parallel to each other to thereby prepares of an optical film (F1).

(Optical Film (F2))

A norbornene-based film was stretched to thereby obtain a retardation film having a thickness of 50 μm, an in-plane retardation $Re_2$ of 220 nm and an Nz of 1.05. The retardation film and the polarizing plate were laminated together with a pressure sensitive adhesive so that the slow axis of the retardation film and the absorption axis of the polarizing plate are parallel to each other to thereby prepare of an optical film (F2).

(Liquid Crystal Display)

A liquid crystal cell in IPS mode having a retardation value of 310 nm for wavelength of 550 nm was used and as shown in FIG. 4, the optical film (F1) and the optical film (F2) were laminated, respectively, on the cell substrate on the viewing side and the cell substrate on the light incidence side with a pressure sensitive adhesive. The retardation film sides of the optical films (F1) and (F2) faced the liquid crystal cell. In this case, the absorption axis of the polarizing plate of the optical film (F2) and an extraordinary refractive index direction of a liquid crystal material in a liquid crystal cell were parallel to each other. The optical film (F1) and the optical film (F2) were disposed so that the absorption axes of the polarizing plates thereof are perpendicular to each other.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 60. The measurement of a contrast ratio was conducted with EZ Contrast (manufactured by ELDIM Inc.,).

Example 2

(Optical Film (F2))

A film (Pure Ace WR, manufactured by TEIJIN CHEMICALS LTD.) satisfying a relation of $\{\Delta nd(450 nm)/\Delta nd(550 nm)\}<1$ in wavelength dependency of retardation was stretched to thereby obtain a retardation film having a thickness of 150 μm, an in-plane retardation $Re_2$ of 220 nm and an Nz of 1.0. The retardation film and the polarizing plate similar to that used in Example 1 were laminated together so that the slow axis of the retardation film and the absorption axis of the polarizing plate are parallel to each other with a pressure sensitive adhesive to thereby obtain an optical film (F2).

(Liquid Crystal Display)

A liquid crystal display was fabricated in a similar way to that in Example 1 with the exception that in Example 1, the optical film (F2) obtained in Example 2 was employed.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 65.

Example 3

(Liquid Crystal Display)

The optical film (F1) and the optical film (F2) obtained above in Example 1 were employed. A liquid crystal in IPS mode having a retardation value of 310 nm for wavelength of 550 nm was employed and, as shown in FIG. 5, the optical films (F2) and (F1) were laminated, respectively, on the cell substrate on the viewing side and the cell substrate on the light incidence side. The retardation film sides of the optical films (F1) and (F2) faced the liquid crystal cell. In this case, the absorption axis of the polarizing plate of the optical film (F1) and an extraordinary refractive index direction of a liquid crystal in the liquid crystal cell were perpendicular to each other. The optical film (F1) and the optical film (F2) were disposed as shown in FIG. 5.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 60.

Example 4

(Optical Film (F3))

A polycarbonate film was stretched to thereby obtain a retardation film having a thickness of 60 μm, an in-plane retardation $Re_3$ of 310 nm and an Nz of 0. The in-plane retardation $Re_3$ is equal to a retardation value of the liquid crystal cell in IPS mode. The retardation film and the polarizing plate similar to that used in Example 1 are laminated together so that the slow axis of the retardation film and the absorption axis of the polarizing plate are perpendicular to each other with a pressure sensitive adhesive to thereby obtain an optical film (F3).

(Liquid Crystal Display)

A liquid crystal display was fabricated in a similar way to that in Example 1 with the exception that in Example 1, the optical film (F3) was employed instead of the optical film (F2). The optical film (F1) and the optical film (F3) were disposed as shown in FIG. 6.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 70.

Example 5

(Liquid Crystal Display)

A liquid crystal display was fabricated in a similar way to that in Example 3 with the exception that in Example 3, the optical film (F3) obtained in Example 4 was employed instead of the optical film (F2). The optical film (F1) and the optical film (F3) were disposed as shown in FIG. 7.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 70.

Comparative Example 1

(Liquid Crystal Display)

The polarizing plates obtained in Example 1 was laminated on both surfaces of a IPS mode liquid crystal cell similar to that in Example 1 with a pressure sensitive adhesive to thereby fabricate a liquid crystal display. The polarizing plates disposed on both surfaces of the liquid crystal cell in such that the absorption axes were perpendicular to each other.

(Evaluation)

The liquid crystal display was placed on the backlight to measure a contrast ratio in a direction of gradient to make 70 degree from normal direction was measured in a direction to make an angle of 45 degrees to relative to the optical axis of the polarizing plates with the absorption axes thereof perpendicular to each other and the measured contrast ratio was 10.

What is claimed is:

1. An IPS mode liquid crystal display comprising a liquid crystal cell containing a pair of substrates between which a liquid crystal layer is sandwiched and driven in IPS mode and a backlight, comprising:

an optical film (F1) provided on a cell substrate on one side of the liquid crystal cell and comprises a polarizing plate and a retardation film together in such a way that an absorption axis of the polarizing plate and a slow axis of the retardation film are perpendicular or parallel to each other, wherein the polarizing plate comprises a transparent protective film on both surfaces of a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d(nm) by definition, an in-plane retardation $Re=(nx-ny) \times d$ is 10 nm or less and a thickness direction retardation $Rth=\{(nx+ny)/2-nz\} \times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_1$, $ny_1$ and $nz_1$, respectively; and a film thickness is $d_1$ (nm) by definition, an Nz value represented by $Nz=(nx_1-nz_1)/(nx_1-ny_1)$ is in the range of from 0.3 to 0.7 and an in-plane retardation $Re_1=(nx_1-ny_1)\times d_1$ is in the range of from 200 to 300 nm, and an optical film (F2) provided on a cell substrate on the other side of the liquid crystal cell and comprises a polarizing plate and a retardation film together in such a way that an absorption axis of the polarizing plate and a slow axis of the retardation film are parallel to each other, wherein the polarizing plate comprises a transparent protective films on both surfaces of a polarizer and if a direction on the transparent protective film in which an in-plane refractive index is maximized is X axis, a direction perpendicular to X axis is Y axis and a direction of the film thickness is Z axis; and refractive indexes for wavelength of 550 nm in the axes is nx, ny and nz, respectively; and a film thickness is d(nm) by definition, an in-plane retardation $Re=(nx-ny)\times d$ is 10 nm or less and a thickness direction retardation $Rth=\{(nx+ny)/2-nz\}\times d$ is in the range of from 30 to 100 nm, and the retardation film satisfies that if a direction on the film in which an in-plane refractive index is maximized is X axis and a direction perpendicular to X axis is Y axis and a direction of the film thickness is Z axis; and refractive indexes for wavelength of 550 nm in the axes is $nx_2$, $ny_2$ and $nz_2$, respectively; and a film thickness is $d_2$ (nm) by definition, an Nz value represented by $Nz=(nx_2-nz_2)/(nx_2-ny_2)$ is in the range of from 0.9 to 1.2 and an in-plane retardation $Re_2=(nx_2-ny_2)\times d_2$ is in the range of from 150 to 280 nm, wherein the absorption axes of the polarizing plates of the optical film (F1) and the optical film (F2) are perpendicular to each other, and both films are disposed so that the retardation film sides face the liquid crystal cell, wherein the optical film (F1) is disposed on the cell substrate on the viewing side and the optical film (F2) is disposed on the cell substrate on the side of incidence of light from the backlight, and an extraordinary refractive index direction of a liquid crystal material in the liquid crystal cell when no voltage is applied and the absorption axis of the polarizing plate in the optical film (F2) on the light incidence side are parallel to each other, and wherein the sum of the in-plane retardation value of the liquid crystal cell and the in-plane retardation value of the retardation film used in the optical film (F2) is in the range of 550 nm±40 nm.

2. The IPS mode liquid crystal display according to claim 1, wherein the liquid crystal cell driven in IPS mode is a liquid crystal cell in IPS mode having a retardation value in the range of from 230 to 400 nm for wavelength of 550 nm when no voltage is applied.

3. The IPS mode liquid crystal display according to claim 1, wherein the optical film (F2) satisfies a relation of $\{\Delta nd(450\ nm)/\Delta nd(550\ nm)\}<1$ in wavelength dependency of retardation, wherein $\Delta nd(450\ nm)$ and $\Delta nd(550\ nm)$ are in-plane retardations in the respective wavelengths 450 nm and 550 nm.

* * * * *

UNITED STATES PATENT AND TRADEMARK OFFICE
CERTIFICATE OF CORRECTION

PATENT NO. : 7,586,569 B2
APPLICATION NO. : 11/084027
DATED : September 8, 2009
INVENTOR(S) : Yano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Fourteenth Day of September, 2010

David J. Kappos
*Director of the United States Patent and Trademark Office*